United States Patent [19]  
Mizusawa et al.

[11] Patent Number: 4,642,990
[45] Date of Patent: Feb. 17, 1987

[54] MASTER CYLINDER AND OIL-HYDRAULIC BOOSTER ASSEMBLY

[75] Inventors: Mitutoyo Mizusawa, Ueda; Makoto Horiuchi, Maruko, both of Japan

[73] Assignees: Nissin Kogyo Kabushiki Kaisha, Nagano; Honda Giken Kogyo Kabushiki Kaisha, Tokyo, both of Japan

[21] Appl. No.: 680,624

[22] Filed: Dec. 11, 1984

[30] Foreign Application Priority Data

Mar. 13, 1984 [JP] Japan ................................. 59-47897
Mar. 13, 1984 [JP] Japan ................................. 59-47899

[51] Int. Cl.$^4$ ............................................. B60T 13/20
[52] U.S. Cl. ...................................... 60/554; 60/578; 91/369 R; 91/376 R
[58] Field of Search ...................... 60/547.1, 548, 574, 60/578, 554; 91/369 A, 369 C, 376 R

[56] References Cited

U.S. PATENT DOCUMENTS

| 3,834,277 | 9/1974 | Yabuta | 91/376 R |
| 4,417,445 | 11/1983 | Furuta | 60/578 |
| 4,433,543 | 2/1984 | Thomas | 60/547.1 |
| 4,435,960 | 3/1984 | Farr | 60/547.1 |
| 4,458,490 | 7/1984 | Newhouse | 60/548 |
| 4,475,336 | 10/1984 | Runkle | 60/547.1 |
| 4,490,977 | 1/1985 | Fulmer | 60/547.1 |
| 4,494,445 | 1/1985 | Furuta | 91/369 C |
| 4,506,592 | 3/1985 | Shimamura | 91/369 C |
| 4,514,981 | 5/1985 | Brown | 60/547.1 |

Primary Examiner—Abraham Hershkovitz
Attorney, Agent, or Firm—Armstrong, Nikaido, Marmelstein & Kubovcik

[57] ABSTRACT

In the assembly of a master cylinder and an oil-hydraulic booster connected to the rear thereof, the master cylinder has an axial bore consisting of a forward, small-diameter bore section and a rearward, large-diameter bore section and the master cylinder piston in the master cylinder includes a small-diameter section slidably fitted in the small-diameter bore section of the master cylinder and a large-diameter section slidably fitted in the large-diameter bore section thereof. The forward end portion of the piston in the oil-hydraulic booster is formed smaller in diameter than the large-diameter bore section of the maste cylinder and is arranged proximate the large-diameter section of the master cylinder piston in the master cylinder so as to enter the large-diameter bore section of the master cylinder when the booster piston is advanced. Provided for the booster piston slidably fitted in the oil-hydraulic booster cylinder is a first stop means arranged to define the limit of retraction of the booster input rod in such a manner that, in the process of retraction of the latter, the opening of an output valve arranged to control communication between the output hydraulic pressure chamber of the booster and the oil reservoir tank reaches its maximum as the booster piston reaches its limit of retraction. A second stop means is provided on the booster cylinder to define the retraction limit of the input rod so that the opening of the output valve is minimized with the booster piston reaching its limit of retraction.

2 Claims, 5 Drawing Figures

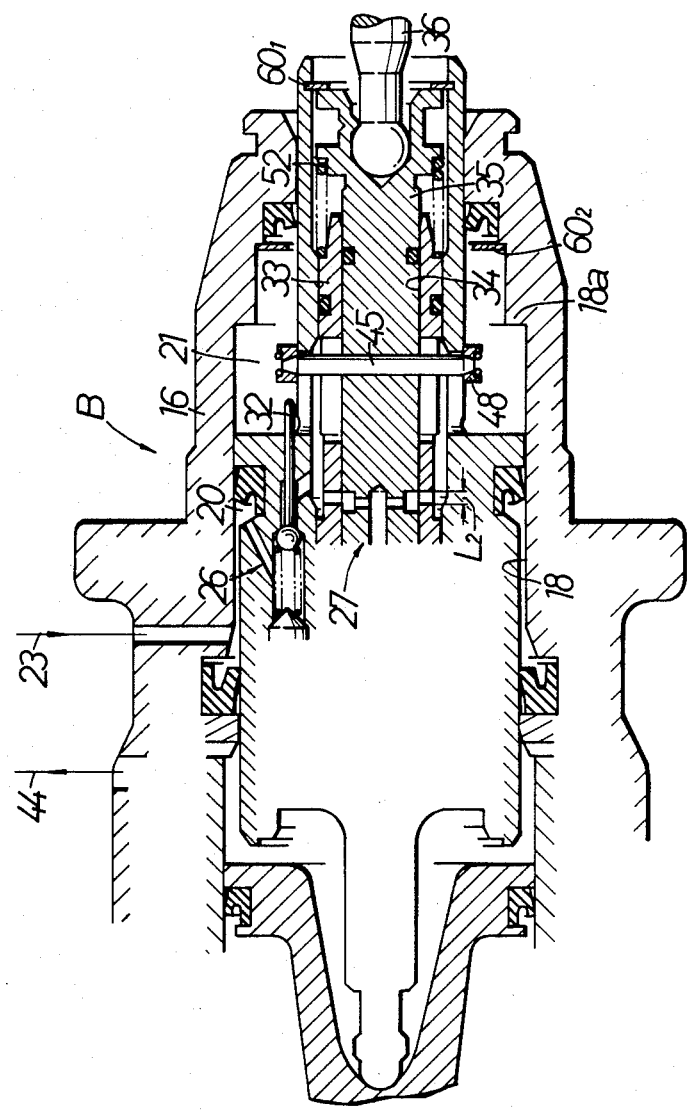

MASTER CYLINDER AND OIL-HYDRAULIC BOOSTER ASSEMBLY

BACKGROUND OF THE INVENTION

1. Field of the Invention

This invention relates generally to master cylinder and oil-hydraulic booster assemblies and more particularly to such assemblies of the type in which the booster cylinder is connected to the rear of the master cylinder and the master piston, slidably fitted in the bore of the master cylinder to produce oil-hydraulic pressure therein, and the booster piston, slidably fitted in the bore of the booster cylinder so as to be power-actuated in accordance with the input thereto, are interconnected through an output rod held in abutting engagement with the rear face of the master piston and a reaction mechanism arranged to feed the reaction force from the master cylinder back to the input side of the assembly.

2. Description of the Prior Art

Conventionally, in assemblies of the type described, the master cylinder and the booster cylinder are formed with cylindrical axial bores designed respectively to guide the master and booster pistons, differing in diameter from each other, individually over their whole length of stroking movement. Because of this, the whole length of the assembly has been very large and, for example, where the assembly is installed in an engine compartment of limited space to serve the purpose of actuating the oil-hydraulic brake system of the motor vehicle, interference with the engine and engine accessories has often made the installation practically infeasible.

In oil-hydraulic boosters, generally usable in such assembly, stop means to define the limit of retraction of the input rod thereby to determine the opening degree of the outlet valve when opened is provided solely on the booster piston and, therefore, the opening of the outlet valve remains the same not only when the booster piston is at its limit of retraction but during the whole course of its retraction.

When the input rod is driven forward for booster operation, the stroke required of the input rod to close the outlet valve and open the inlet valve is a stroke relative to the booster piston and this causes a delay in forward movement of the booster piston. It is desired, therefore, that the relative stroke of the input rod be reduced to a minimum and, to this end, the opening of the outlet valve should be limited as much as possible.

On the other hand, for rapid retraction of the booster piston from its operating position, the outlet valve opening should be set as large as possible to permit quick discharge of the hydraulic fluid from the output hydraulic chamber of the oil-hydraulic booster into the oil reservoir tank.

In this manner, the outlet valve is subject to contradictory requirements for its opening and serious considerations are required in actual design.

SUMMARY OF THE INVENTION

In view of the above, the present invention has for its primary object the provision of a master cylinder and booster assembly of the type described which is so designed that, in booster operation, the forward end portion of the advancing booster piston can be received in a portion of the axial cylindrical bore in the master cylinder to enable reduction in axial length of the cylindrical bore in the booster cylinder and hence in total length of the assembly, and which is simplified in construction and can be installed with ease in a limited space such as in the engine compartment of motor vehicles.

To attain the object described above, the assembly of the present invention is characterized in that the axial bore of the master cylinder is comprised of a forward, small-diameter bore section and a rearward, large-diameter bore section having a diameter larger than that of the forward end portion of the booster piston, the master cylinder piston being comprised of a small-diameter section slidably fitted in the small-diameter bore section of the master cylinder and a large-diameter section slidably fitted in the large-diameter bore section of the master cylinder. The booster piston is arranged proximate the large-diameter section of the master cylinder piston so as to be movable into the large-diameter bore section of the master cylinder when the booster piston is forwardly actuated.

In addition to such arrangement, an annular structure may be arranged between the body member of the master cylinder and the booster cylinder for abutting engagement with the rear end of the master cylinder piston to define the limit of retraction thereof and slidably fitted over the forward end portion of the booster piston in oil-tight fashion to constitute the front end wall of the input hydraulic chamber. Such annular structure is intended to serve the stop function for the master cylinder piston and the barrier function for defining the input hydraulic chamber and is effective not only to simplify the construction of the assembly by reducing the number of parts required but also to enable proximate arrangement of the master cylinder and booster pistons and further reduction in total length of the assembly, further facilitating installation of the assembly in the engine compartment of a motor vehicle or the like limited space.

A second object of the present invention is to provide a hydraulic booster unit of the type described which is capable of meeting the two contradictory requirements as discussed above in regard to the degree of opening of the outlet valve.

To attain this object, the present invention is characterized in that a first stop means is provided on the booster piston which defines the limit of retraction of the input rod so as to keep the opening of the outlet valve at a maximum during the process of retraction of the booster piston and a second stop means is provided on the booster cylinder which defines the limit of retraction of the input rod so as to reduce the opening of the outlet valve to a minimum at the limit of retraction of the booster piston.

With this arrangement, it will be appreciated that in forward operation of the input rod the outlet valve can be closed with a minimum forward stroke of the input rod, enabling reduction in stroke of the input rod relative to the booster piston and hence in delay of the booster piston in forward operation. Further, in the retraction period of the input rod, the outlet valve can be opened to its largest opening so that the hydraulic pressure in the output hydraulic chamber is quickly exhausted allowing the booster piston to retract rapidly. Thus, the booster piston is capable of exhibiting an improved response characteristic with respect to the input rod in both advancing and retracting operations.

The above and other objects, features and advantages of the present invention will become apparent from the following detailed description of a preferred embodiment when taken in conjunction with the accompanying drawings.

BRIEF DESCRIPTION OF THE DRAWINGS

In the drawings

FIG. 2A is a view similar to FIG. 2 and explanatory of the operation of the assembly;

DESCRIPTION OF THE PREFERRED EMBODIMENT

Figure 1:
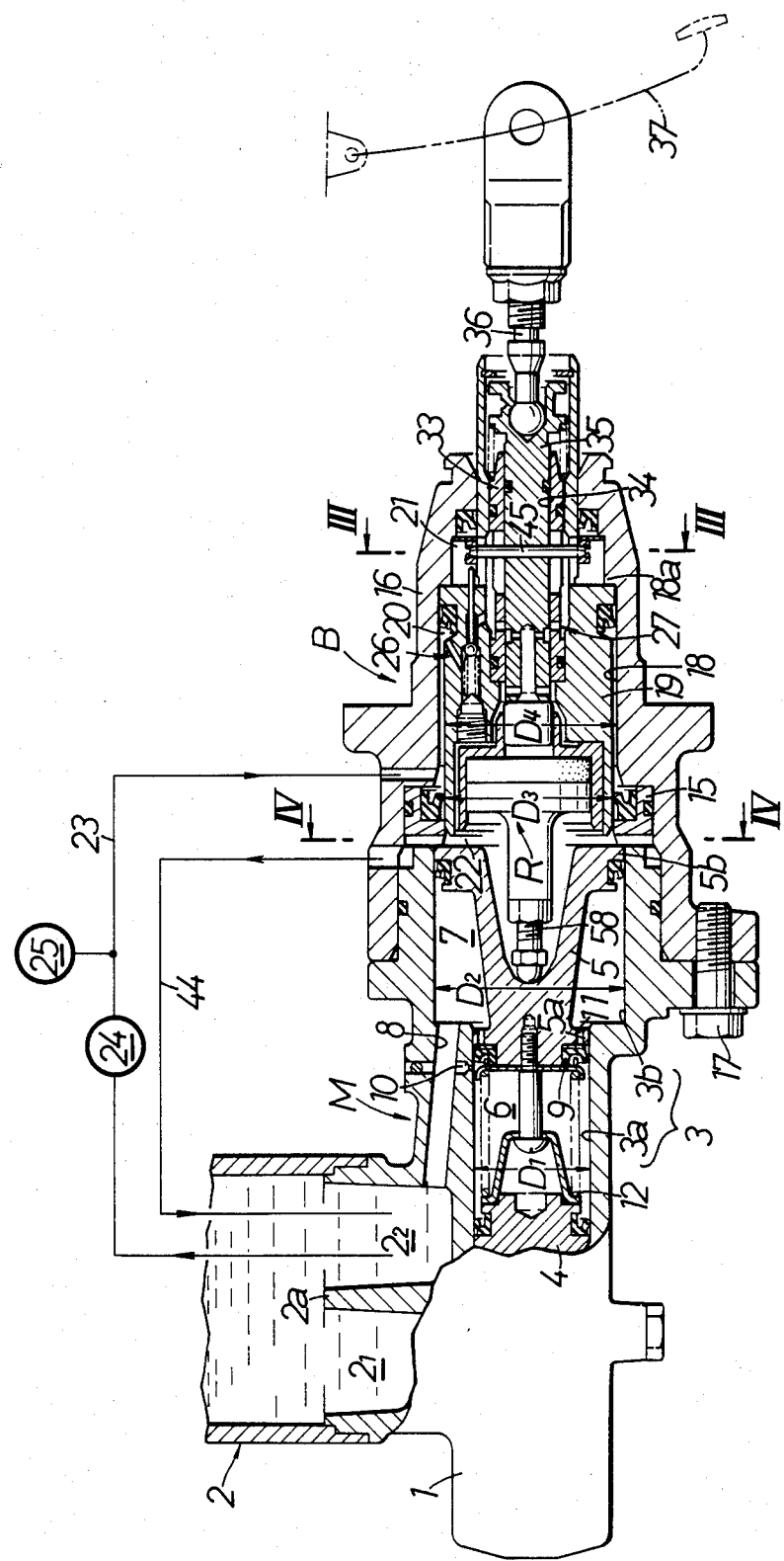
FIG. 1 is a partly schematic elevational view in axial cross section of an assembly embodying the present invention.

One preferred embodiment of the present invention will now be described with reference to the drawings. Referring first to FIG. 1, reference character M designates a tandem type master cylinder for a dual hydraulic circuit automotive brake system. Formed on top of the cylinder body 1 is an integral oil reservoir tank 2 the lower half of whose interior is divided by a partition wall 2a into front $2_1$ and rear $2_2$ oil reservoirs.

The cylinder bore 3 in the cylinder body 1 is shouldered, being comprised of a small-diameter bore section 3a extending immediately below the reservoir tank 2 and a large-diameter bore section 3b connected to the small-diameter section 3a at the rear end of the latter. Slidably fitted in the small-diameter bore section 3a are the whole of a front master cylinder piston member 4 which defines in cooperation with the front end wall of the cylinder bore 3 a front hydraulic chamber (not shown) to be fed with hydraulic fluid from the front reservoir $2_1$ and the front end portion of a rear master cylinder piston 5 or its small-diameter piston portion 5a which defines together with the front master piston 4 a rear hydraulic chamber 6 to be fed with hydraulic fluid from the rear oil reservoir $2_2$. Slidably fitted in the large-diameter bore section 3b is the rear end portion of the rear master piston 5 or its large-diameter piston portion 5b. In this fashion, the rear master piston 5 is comprised of small-diameter piston portion 5a and large-diameter piston portion 5b.

The two piston portions 5a and 5b cooperate in the large-diameter bore section 3b to define a replenishing oil chamber 7 which is held in fluid communication with the rear oil reservoir $2_2$ by way of a fluid passageway 8.

A piston cup 9 of elastic material is fitted to the front face of small-diameter piston portion 5a and, as shown, a relief port 10 is formed in the cylinder body 1 at such a location that, when the rear master piston 5 is in its fully retracted position, the relief port 10 lies just in front of the piston cup 9, establishing a fluid communication between the rear oil hydraulic chamber 6 and oil passageway 8. Through holes 11 are formed in the small-diameter piston portion 5a for fluid communication of the replenishing oil chamber 7 with the back of piston cup 9.

Restoring springs 12 are arranged respectively in the rear hydraulic chamber 6 and in the front hydraulic chamber, not shown, to normally urge the rear master piston 5 and front master piston 4 in the retracting direction.

It will be readily noted that, when the rear master cylinder piston 5 is pushed forwardly and the piston cup 9 is moved past the relief port 10, hydraulic pressure is produced in the rear hydraulic chamber 6 and fed therefrom into the hydraulic brake circuit, not shown, which is in communication with the rear hydraulic chamber 6.

Subsequently, upon retraction of the rear master piston 5 from its advanced position, the pressure in the rear hydraulic chamber 6 is reduced and, because of the pressure differential arising across the piston cup 9, the peripheral edge portion thereof is flexed forwardly away from the inner wall surface of the cylinder bore 3. As the result, brake fluid from the rear reservoir $2_2$ is allowed to flow through oil passageway 8, replenishing oil chamber 7 and through holes 11 into the rear hydraulic chamber 6 for fluid replenishment thereof. In the event that the hydraulic chamber 6 is excessively replenished, the excess of fluid is returned to the rear reservoir $2_2$ through relief port 10 and passageway 8.

The front master piston 4 is advanced to produce hydraulic pressure in the front hydraulic chamber, not shown, as the pressure in the rear hydraulic chamber 6 is raised, and the hydraulic pressure thus produced is transmitted to the associated hydraulic brake circuit, not shown. Subsequently, when the front master piston 4 retracts, the front hydraulic chamber is replenished with oil from front reservoir $2_1$. The mechanism for such production of hydraulic pressure and oil replenishment is essentially similar to the one associated with the rear hydraulic chamber 6 and will not be described here in any detail.

Figure 2:
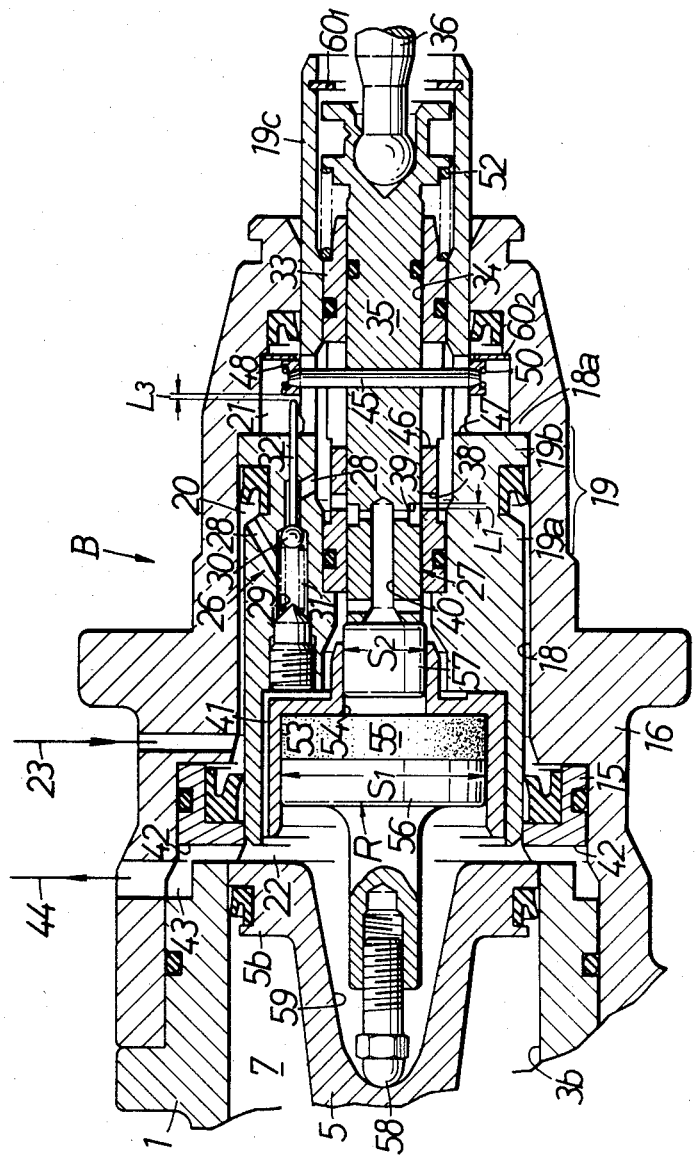
FIG. 2 is a fragmentary enlarged view of the essential parts of the assembly of FIG. 1.

As clearly seen in FIG. 2, the hydraulic booster B includes a booster cylinder 16 connected to the rear end of the cylindrical body 1 of master cylinder M with an annular structure 15 interposed therebetween. Bolt means 17 (FIG. 1) are provided to join the cylinder body 1 and booster cylinder 16 tightly with each other.

Let, as indicated in FIG. 1, $D_1$ be the diameter of the small-diameter section 3a of cylinder bore 3 of the master cylinder M, $D_2$ being the diameter of the large-diameter section 3b of cylinder bore 3, $D_3$ being the internal diameter of annular structure 15, $D_4$ representing the diameter of axial bore 18 in the booster cylinder 16, then the relationship between these dimentions is expressed by the following formula:

$$D_1 < D_3 < D_4 < D_2$$

Referring to FIG. 2, the booster piston 19 is comprised of a front, small-diameter piston portion 19a, a rear, large-diameter piston portion 19b and a rod portion 19c which extends rearwardly from the rear end face of the large-diameter piston portion 19b. The small-diameter and large-diameter piston portions 19a and 19b are slidably fitted respectively in the bore hole of annular structure 15 and the cylinder bore 18 of booster cylinder 16 in oil-tight fashion while the rod portion 19c of booster piston 19 extends outwardly through the rear end wall portion of booster cylinder 16 in oil-tight fashion. To define the limit of retraction of the booster piston 19, an annular shoulder 18a is formed inside the cylinder bore 18 close to the rear end thereof to support the rear end face of large-diameter piston portion 19b.

As seen in FIG. 2, the annular structure 15 serves at its front end face to support the rear, master piston 5 at the rear end thereof and thus defines the limit of retraction of the rear master piston 5. Also, in the booster cylinder bore 18, an input hydraulic pressure chamber 20 is defined between the annular structure 15 and the large-diameter piston portion 19b while an output hydraulic pressure chamber 21 is defined between the rear end face of large-diameter piston portion 19b and the rear end wall of booster cylinder 16. As will be obvious, the output hydraulic pressure chamber 21 has an internal cross section larger than that of the input hydraulic pressure chamber 20. Further, the large-diameter piston portion 5b of rear master piston 5 in the master cylinder M and the small-diameter piston portion 19a of booster piston 19 together define an outlet chamber 22 therebetween.

As seen in FIG. 1, the input hydraulic pressure chamber 20 is connected through a fluid feed line 23 to oil reservoir tank 2. In the fluid feed line 23, a hydraulic fluid pump 24 is arranged to serve as a fluid pressure source effective to cause fluid stored in the reservoir tank 2 to flow into the input hydraulic pressure chamber 20 and an accumulator 25 is connected on the downstream side of the pump 24.

The booster piston 19 has an inlet valve 26 and an outlet valve 27 both incorporated therein, as will be described below in detail.

The inlet valve 26 is of the normally closed type and includes a tubular valve chamber 29 (FIG. 2) .ormed in the booster piston 19 midway of an oil passage 28 and extending parallel to the axis of booster piston 19. The oil passage 28, formed in the booster piston 19, extends between the input and output hydraulic pressure chambers 20 and 21 for fluid communication therebetween. The inlet valve 26 further includes a ball-shaped valve element 30 normally resting on a valve seat formed on the rear end wall of the valve chamber 29 to close the oil passage 28, a valve spring 31 arranged in the valve chamber 29 to urge the valve element 30 in closing direction, and an operating rod 32 operable to move the valve element 30 apart from the valve seat against the bias of valve spring 31. The operating rod 32 is slidably fitted in the booster piston 19 for sliding movement in the direction axial thereof and has a rear end portion projecting beyond the rear end face of large-diameter piston portion 19b into the output hydraulic pressure chamber 21.

The outlet valve 27 is comprised of a valve sleeve 33 fitted in the booster piston 19 along the axis thereof and a valve piston 35 slidably fitted in the axial opening of valve sleeve 33 or the valve bore 34. The valve piston 35 has its rear end portion extending outwardly beyond the rear end of valve sleeve 33 to serve as an input rod which is connected with a brake pedal 37 through the medium of a push rod 36.

Figure 4:
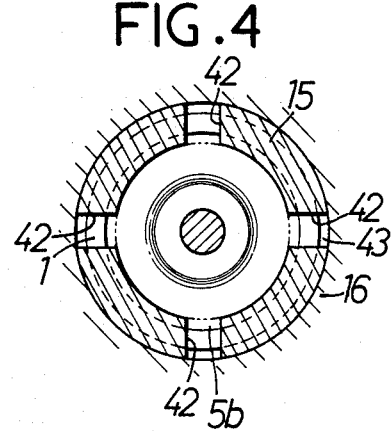
FIG. 4 is a cross section taken along the line IV—IV in FIG. 1.

The valve sleeve 33 has outlet ports 38 communicating with the output hydraulic chamber 21 while the valve piston 35 is formed therein with an annular groove 39 which is placed out of communication with the outlet ports 38 and into communication therewith as the valve piston 35 is advanced and retracted relative to the valve sleeve 33 and an axial oil passage 40 which is held in communication with the annular groove 39. The oil passage 40 is also held in communication with the outlet chamber 22 by way of an oil passage 41 formed in the booster piston 19. The outlet chamber 22 is connected to the oil tank 2 by means of radial grooves 42 formed in the front end face of guide ring or structure 15, (see also FIG. 4), an annular oil passage 43 formed around the cylinder body 1 at its rear end, and a return oil line 44 connected to the oil passage 43.

Figure 3:
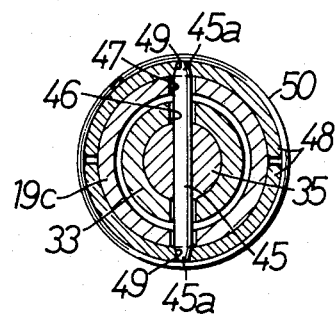
FIG. 3 is an enlarged cross-sectional view taken along the line III—III in FIG. 4.

Located in the output hydraulic chamber 21 is a pin 45 fitted through the valve piston 35 at right angles to the axis thereof. The pin 45 extends at its opposite ends through axially elongate slots 46 and 47 respectively formed in the walls of piston sleeve 33 and the tubular rod portion 19c of booster piston 19 and has frustoconically shaped opposite ends 45a, 45a projecting from the outer peripheral surface of the rod portion 19c. As shown in FIG. 3, the opposite projecting ends 45a, 45a of the pin 45 are fitted in connecting holes 49 formed in a split type actuator ring 48 which is slidably fitted over the outer peripheral surface of the rod portion 19c of booster piston 19. A coiled spring 50 is wound round the outer periphery of the actuator ring 48 to hold the pin 45 and actuator ring 48 firmly connected together. As shown in FIGS. 2 and 2A, the actuator ring 48 is arranged in opposing relation to the rear end of operating rod 32 for the inlet valve 26 so that, upon advancement of the inlet rod, i.e., valve piston 35, the actuator ring 48 is brought into abutting engagement with the end of operating rod 32 to push the latter forward.

A return spring 52 is arranged in compression between the rod portion 19c of booster piston 19 and the valve piston 35 normally to urge the latter rearwardly. The return spring 52 is held engaged at one end with the rear end portion of valve sleeve 33 as well as with the rod portion 19c normally to urge the valve piston 35 and sleeve 33 axially away from each other, thus serving the function of holding the valve sleeve 33 in a fixed position relative to the booster piston 19.

To define the limit of retraction of the input rod or valve piston 35 in the process of retraction of booster piston 19, a first annular stop $60_1$ is secured to the inner wall of the rod portion 19c of booster piston 19 in a position engageable with the rear end of valve piston 35.

Further, to define the limit of retraction of the valve piston 35 when the booster piston 19 is in a fully retracted position, a second annular stop $60_2$ is secured to the inner wall of booster cylinder 16 for abutting engagement with the rear end face of actuator ring 48.

As seen in FIG. 2, upon retraction of valve piston 35 the outlet valve 27 is opened with the outlet port 38 placed in communication with the annular groove 39, the degree of opening being set so as to reach a maximum $L_2$ (FIG. 2A) when in the process of retraction of booster piston 19 the valve piston 35 comes into abutting engagement with the first stop $60_1$ and to exhibit a minimum $L_1$ (FIG. 2) when the booster piston 19 has been fully retracted with the valve piston 35 coming to rest on the second stop $60_2$ by way of the pin 45 and actuator ring 48.

Further, the distance, $L_3$, between the operating rod 32 of inlet valve 26 and the actuator ring 48 when the booster piston 19 is in its fully retracted position and the valve piston 35 in its rearmost position as defined by the second stop $60_2$ is set at a value slightly larger than the minimum opening, $L_1$, of outlet valve 27.

The booster piston 19 is formed therein with a large-diameter bore 53 opening at the front end to the outlet chamber 22 and a small-diameter bore 54 extending rearwardly from the large-diameter bore 53 to the valve bore 34. In the large-diameter bore 53, an elastic piston or pad 55 of rubber material and a thrust piston 56 of the same diameter as that of pad 55 are slidably fitted one after the other, as shown in FIG. 2. In the small-diameter bore 54, a reaction piston 57 is slidably fitted and is engageable at its opposite ends with the oppositely directed end faces of valve piston 35 and elastic piston 55.

The thrust piston 56 is formed with an integral output rod 58 which extends forwardly from the front face of the piston 56. The output rod 58 is held in engagement with the rear master cylinder piston 5, extending deeply into a depression 59 formed in the rear face of rear master cylinder piston 5 so that the rear master cylinder piston 5 and booster piston 19 may be located as proximate as possible to each other.

The depth of depression 59 is so selected as to be equal to or larger than the radius of the large-diameter piston portion 5b of rear master piston 5. This enables the piston 5 to selfcenter in the cylinder body 1 when the piston 5 is pushed forward by the output rod 58.

In the arrangement described above, it is to be noted that the thrust piston 56, elastic piston 55 and reaction piston 57 together constitute a reaction mechanism R for transmitting the reaction force from the master cylinder M to the valve piston 35 during brake operation.

Description will next be made of the operation of the embodiment illustrated.

In the unapplied or released state of the brake pedal 37, the valve piston 35 is held in its fully retracted position, as defined by the second stop $60_2$, with the actuator ring 48 brought into engagement with the stop under the bias of return spring 52 and the annular groove 39 positioned to communicate with the outlet port 38 so that the outlet valve 27 is held open with the minimum amount of opening, $L_1$. On the other hand, the inlet valve 26 is in its closed position with the operating rod 32 released from actuator ring 48 allowing the valve element 30 to rest on the valve seat in valve chamber 29 under the urge of valve spring 31. Accordingly, the input and output hydraulic pressure chambers 20 and 21 are disconnected from each other by means of closed input valve 26 and the output hydraulic chamber 21 is at atmospheric pressure, communicating with the oil tank 2 through the outlet port 38, annular groove 39, oil passage 40, outlet chamber 22, radial grooves 42, annular oil passage 43 and return oil line 44. Therefore, the front and rear master cylinder pistons 4 and 5 and booster piston 19 are held in their respective retracted positions under the bias of return springs 12 acting on the respective master cylinder pistons.

Further, in this case, the input hydraulic pressure chamber 20 is held at a hydraulic pressure as fed from the oil-hydraulic pump 24 or accumulator 25. Such hydraulic pressure, acting upon the front face of the large-diameter piston portion 19b of booster piston 19, also serves to hold the booster piston 19 in its fully retracted position, as shown in FIGS. 1 and 2. The use of ball-shaped valve element 30, which is highly obturating in nature, is effective to prevent any leakage of hydraulic fluid from the input hydraulic chamber 20 into the output hydraulic chamber 21.

Supposing that the brake pedal 37 is depressed to brake the motor vehicle, the push rod 36 is driven forward by the brake pedal 37 to push the valve piston 35 and actuator ring 48 forward and, at first, the annular groove 39 is disconnected from the outlet port 38 to close the outlet valve 27, because of the above-described relation: $L_1 < L_3$. Subsequently, the actuator ring 48, engaging the rear end of operating rod 32, pushes the latter forward to move the valve element 30 apart from the valve seat thus to open the inlet valve 26.

As a consequence, the output hydraulic chamber 21 is placed out of communication with the oil tank 2 and the hydraulic pressure being transmitted from the oil hydraulic pump 24 or accumulator 25 to the input hydraulic chamber 20 is also transmitted through oil passage 28 and valve chamber 29 to the output hydraulic chamber 21. Accordingly, the booster piston 19 advances under the hydraulic pressure, now acting on the rear end face thereof, to cause the rear master piston 5 to advance through the medium of the reaction mechanism R and output rod 58. In this manner, the master cylinder M is booster-operated for brake application.

It is to be noted that the forward stroke of valve piston 35 required to close the outlet valve 27 is extremely small, corresponding to the minimum opening $L_1$ of the outlet valve 27, and this means that the forward stroke of valve piston 35 relative to the booster piston 19, as required to produce hydraulic pressure in the output hydraulic chamber 21 for hydraulic operation of the booster piston 19, is very limited and the response characteristic of the booster piston 19 to forward movement of the valve piston or input rod 35 is materially improved.

The front end portion of booster piston 19 hydraulically started proceeds into the large-diameter bore section 3b of master cylinder M, following the rear master cylinder piston 5. Thus, the large-diameter bore 3b serves to accept the front end portion of advancing booster piston 19 as well as to guide the large-diameter piston portion 5b of rear master cylinder piston 5.

During the time when the booster piston 19 is pushing the rear master cylinder piston 5 forwardly, the thrust piston 56 receives the reaction force of master cylinder M from the rear master cylinder piston 5 and acts to compress the elastic piston 55. The force of compression is partly fed back to the brake pedal 37 through the reaction piston 57, valve piston 35 and push rod 36 to enable the vehicle driver to feel the magnitude of the brake force being applied. The force multiplication or booster factor in this operation is expressed by the formula: $S_1/S_2$, where $S_1$ represents the cross-sectional area of thrust piston 56 and $S_2$, that of reaction piston 57.

Subsequently, when the brake pedal 37 is released to deactuate the master cylinder M, the valve piston 35 retracts under the bias of return spring 52 together with the actuator ring 48; first, the actuator ring 4 is moved apart from the operating rod 32 so that the inlet valve 26 is closed and then the outlet valve 27 is opened, as shown in FIG. 2A, with the annular groove 39 in valve piston 35 coming to fully communicate with the outlet port 38. The retracting movement of valve piston 35 is limited by the first stop $60_1$ and, when the valve piston is placed in its fully retracted position, the opening of outlet valve 27 reaches its maximum $L_2$, as shown in FIG. 2A.

With the maximum opening $L_2$ of outlet valve 27, the fluid pressure previously existing in the output hydraulic pressure chamber 21 can be quickly exhausted through the outlet port 38, annular groove 39 and return oil line 44 into oil tank 2, permitting the booster piston 19 to retract rapidly under the spring bias such as of the restoring springs 12 in master cylinder M.

As the booster piston 19 assumes its fully retracted position, engaging the annular shoulder 18a, the valve piston 35 comes into engagement with the second stop $60_2$, assuming a slightly advanced position relative to the booster piston 19 as compared with the position the valve piston assumes engaging the first stop $60_1$ so that the amount of opening of outlet valve 27 is reduced back to its minimum $L_1$.

Though, in the embodiment illustrated, the oil reservoir tank 2 of master cylinder M is utilized also as the one for oil-hydraulic booster B, it will be apparent that an exclusive reservoir tank for the booster B may be provided separately, if desired.

What is claimed is:

1. A master cylinder and oil-hydraulic booster assembly comprising a master cylinder and an oil-hydraulic booster connected to the rear of the master cylinder and in which a master cylinder piston, slidably fitted in the axial bore of the master cylinder and operable to produce oil-hydraulic pressure, and a booster piston, slidably fitted in the cylinder bore of the oil-hydraulic booster so as to be power-actuated in accordance with the input thereto, are interconnected through the intermediary of an output rod held in engagement with the rear face of the master cylinder piston and a reaction mechanism arranged to feed the reaction force from the master cylinder back to the input side of the assembly, the master cylinder and oil-hydraulic booster assembly being characterized in that the axial bore of the master cylinder is comprised of a forward, small-diameter bore section and a rearward, large-diameter bore section having a diameter larger than that of a front end portion of the booster piston, the master cylinder piston being comprised of a small-diameter piston section slidably fitted in said small-diameter bore section of the master cylinder and a large-diameter piston section slidably fitted in said large-diameter bore section thereof, said booster piston being arranged proximate said large-diameter master cylinder piston section so as to be movable into said large-diameter bore section of the master cylinder when the booster piston is advanced.

2. An assembly as claimed in claim 1, characterized in that said booster piston, being slidably fitted in the cylinder bore of said booster, defines therein a forward, input hydraulic pressure chamber which communicates with a hydraulic pressure source and a rearward, output hydraulic pressure chamber having a cross-sectional area larger than that of said input hydraulic pressure chamber and that an annular structure is arranged between said master cylinder and the booster cylinder for abutting engagement with the rear end of said master cylinder piston to limit retraction thereof and is slidably fitted over the forward portion of said booster piston in oil-tight fashion to constitute the front end wall of said input hydraulic pressure chamber.

* * * * *